(12) United States Patent
Marathe et al.

(10) Patent No.: US 8,903,860 B2
(45) Date of Patent: Dec. 2, 2014

(54) METHOD AND SYSTEM FOR IDENTIFICATION OF DATA OWNER IN AN UNSTRUCTURED DATA ENVIRONMENT

(75) Inventors: Nikhil Marathe, Pune (IN); Parag V. Thakur, Mumbai (IN); Ganesh Vasantrao Gaikwad, Pune (IN); Mayank Shekhar, Pune (IN); Ketan Shah, San Jose, CA (US); Sharad Srivastava, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 676 days.

(21) Appl. No.: 12/724,177

(22) Filed: Mar. 15, 2010

(65) Prior Publication Data

US 2011/0225199 A1    Sep. 15, 2011

(51) Int. Cl.
*G06F 17/30* (2006.01)
*G06T 11/20* (2006.01)
*G06Q 10/10* (2012.01)

(52) U.S. Cl.
CPC .......... *G06F 17/3007* (2013.01); *G06T 11/206* (2013.01); *G06Q 10/10* (2013.01)
USPC .......................................... 707/781; 345/440

(58) Field of Classification Search
USPC .......................................... 707/781; 345/440
See application file for complete search history.

(56) References Cited

U.S. PATENT DOCUMENTS

| 8,127,134 B2* | 2/2012 | Iyengar et al. | 713/167 |
| 2006/0294090 A1* | 12/2006 | Johnson et al. | 707/5 |
| 2010/0010968 A1* | 1/2010 | Redlich et al. | 707/3 |

* cited by examiner

*Primary Examiner* — Amresh Singh
(74) *Attorney, Agent, or Firm* — Wilmer Cutler Pickering Hale and Dorr LLP

(57) ABSTRACT

A system and method of identifying a data owner examining a plurality of criterion including access type, number of accesses at a given time and over the period of time selected, recentness of access, and permission levels of users. The method of file owner identification comprises collecting a plurality of samples including usage of a file by a plurality of users. A plurality of factors is calculated based on said plurality of users, wherein a respective factor is calculated for each of said plurality of users, wherein each factor is based on a plurality of use elements. Based on said plurality of factors, a file owner is determined of said file from among said plurality of users. The file owner may be communicated and/or displayed e.g., in a graph.

18 Claims, 8 Drawing Sheets

FIG. 6

METHOD AND SYSTEM FOR IDENTIFICATION OF DATA OWNER IN AN UNSTRUCTURED DATA ENVIRONMENT

FIELD

Embodiments according to the present invention generally relate to computer systems, in particular to systems that have a plurality of files that may be shared by a plurality of users.

BACKGROUND

Organizations store large amounts of data, for example, as files in file systems. The files are data sets that are typically owned by a single user. The data owner may have full control over the data set. However, other users may also have varying levels of control over the data set, including: read access, write access, delete control, create control, modify control, list folder content control, read and execute control, special control, etc. Identifying the data owner from the other users that can share the data set is important in cases such as security remediation, data migration, and compliance.

Security remediation takes place when data gets compromised, for example by deletion or overwriting. When recovery occurs, an administrator needs to quickly and accurately discover who owns that data. This can be difficult because many users within the organization may have some level of access to the data, and the many users may access the data on a regular basis. It may not be immediately clear who is the file owner.

In addition with data migration, an administrator may want to move data from one location to another. For example, if data has not been accessed in a long time, the administrator may want to move the data from expensive high performance storage to less expensive low performance storage. However, before moving the data, the administrator will want to notify the data owner of the change and/or get approval from the data owner. Again, the data owner must be determined. Furthermore, with data compliance, administrators may be looking for data owners during administrative activities and execution of other programs.

Identification of a data owner can occur by manually inspecting the records in the access logs and access control logs. Unfortunately, there is a tremendous amount of data in these logs, especially in the case where there are many users. This amount of information can be overwhelming, making it incredibly difficult for an administrator to manually correlate the logs and conclusively identify the data owner.

In one conventional method a data owner is identified based on the total number of accesses to the file. In effect, the user with the highest number of accesses is automatically recommended as the data owner. However, owner identification based only on the total number of accesses can lead to a high number of false positives. For example, a user may only have read access and may access the data many times a day. However, the data owner may only access the data once a week. In this case, an administrator would incorrectly identify the owner of the data based on the highest number of accesses.

SUMMARY

Embodiments of the present invention are directed to a method and system for automatically identifying the owner of data. In one embodiment, a method of automatic file owner identification includes: collecting a plurality of samples indicating usage of a file by a plurality of users; calculating a plurality of factors based on the plurality of users, wherein a respective factor is calculated for each of the plurality of users, wherein each factor is based on a plurality of use elements; based on the plurality of factors, automatically determining a file owner of the file from among the plurality of users; and communicating the file owner.

In some embodiments, the plurality of use elements includes: access type; numbers of accesses over given times; recentness of the accesses; and user permissions of the file. In some embodiments, the access type includes a reading type and a writing type; the numbers of the accesses over given times includes an access frequency of the file over a sample period; and the user permissions of the file includes at least one of a read permission, a write permission, and a full control permission.

In some embodiments, the access type is given a tunable access weight; the numbers of the accesses over given times is given a tunable frequency weight; and the user permissions of the file is given tunable permissions weight. In some embodiments, the calculating further includes calculating a respective value for every user of the file based on the use elements, and calculating a respective normalized value from the respective value for every user, wherein the file owner has the normalized value equal to 1.0.

In some embodiments, the communicating includes displaying an access pattern graph, comprising said plurality of factors. In some embodiments, the collecting includes accessing access logs and access control logs pertaining to the file and the plurality of users.

In another embodiment, a method of automatic file owner identification is described, the method comprising: collecting a plurality of samples from operations of a file by a plurality of users; calculating a respective factor for each sample for each of the plurality of users, wherein each respective factor is based on a plurality of use elements; based on a plurality of respective factors for each user, automatically determining values representing likelihood of file ownership for each of the plurality of users; and displaying the values in a graph.

In some embodiments, each respective factor for each sample equals $(A_i)(K*n)(\text{No. of Access})(P_u)$, wherein: n is a sample number of an individual sample; K is a weight assigned to the time represented by each sample n; $A_i$ is a weight for access type; No. of Access is a number of accesses that occurred in the sample; and $P_u$ is the weight for type of permission (e.g. Read, Write, or Full) and it will be constant for a given user u. In some embodiments, the determining values includes summing all factors for a plurality of samples for a user.

In some embodiments, the determining values further includes calculating a respective value for every user of the file based on factors of said user over a sample duration; and normalizing the respective value for every user to obtain a respective relevance factor for each user. In some embodiments, the operations includes at least one of a read, a write, a delete, a create, a modify, a list folder content, a read and execute, a special, and a full control. In some embodiments, the displaying includes displaying an access pattern graph comprising: a list of users; a period of time; access information of the list of users; user permissions; and said values for the list of users. In some embodiments, the collecting comprises accessing at least one of access logs and access control logs pertaining to said file and said plurality of users.

In yet another embodiment, a system is described comprising: a processor; memory coupled to the processor, wherein the memory includes instructions that when executed cause the system perform a method of automatic file ownership identification, the method comprising: collecting a plurality of samples indicating usage of a file by a plurality of users; calculating a respective factor for each sample for each of the plurality of users, wherein the respective factor is based on a plurality of use elements; based on a plurality of factors for the plurality of samples, automatically determining a file owner of the file from among the plurality of users; and communicating the file owner.

In some embodiments, the plurality of use elements includes: access type; numbers of accesses over given times; recentness of the accesses; and user permissions of the file. In some embodiments, the access type includes a reading type and a writing type; the numbers of the accesses over given times includes an access frequency of the file over a sample period; and the user permissions of the file includes at least one of a read permission, a write permission, and a full control permission. In some embodiments, the access type is given tunable access weight; the numbers of the accesses over given times is given a tunable frequency weight; and the user permissions of the file is given tunable permissions weight.

In some embodiments, the automatically determining further includes: calculating a respective value for every user of the file based on factors associated with each user; and calculating a normalized value from the respective value for every user, wherein the file owner has the normalized value equal to 1.0. In some embodiments, the collecting includes accessing access logs and access control logs pertaining to the file and the plurality of users.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

FIG. 6 is the access pattern graph including a relevance factor for the method of automatic file ownership identification in accordance with an embodiment of the present invention.

DETAILED DESCRIPTION

Figure 1:
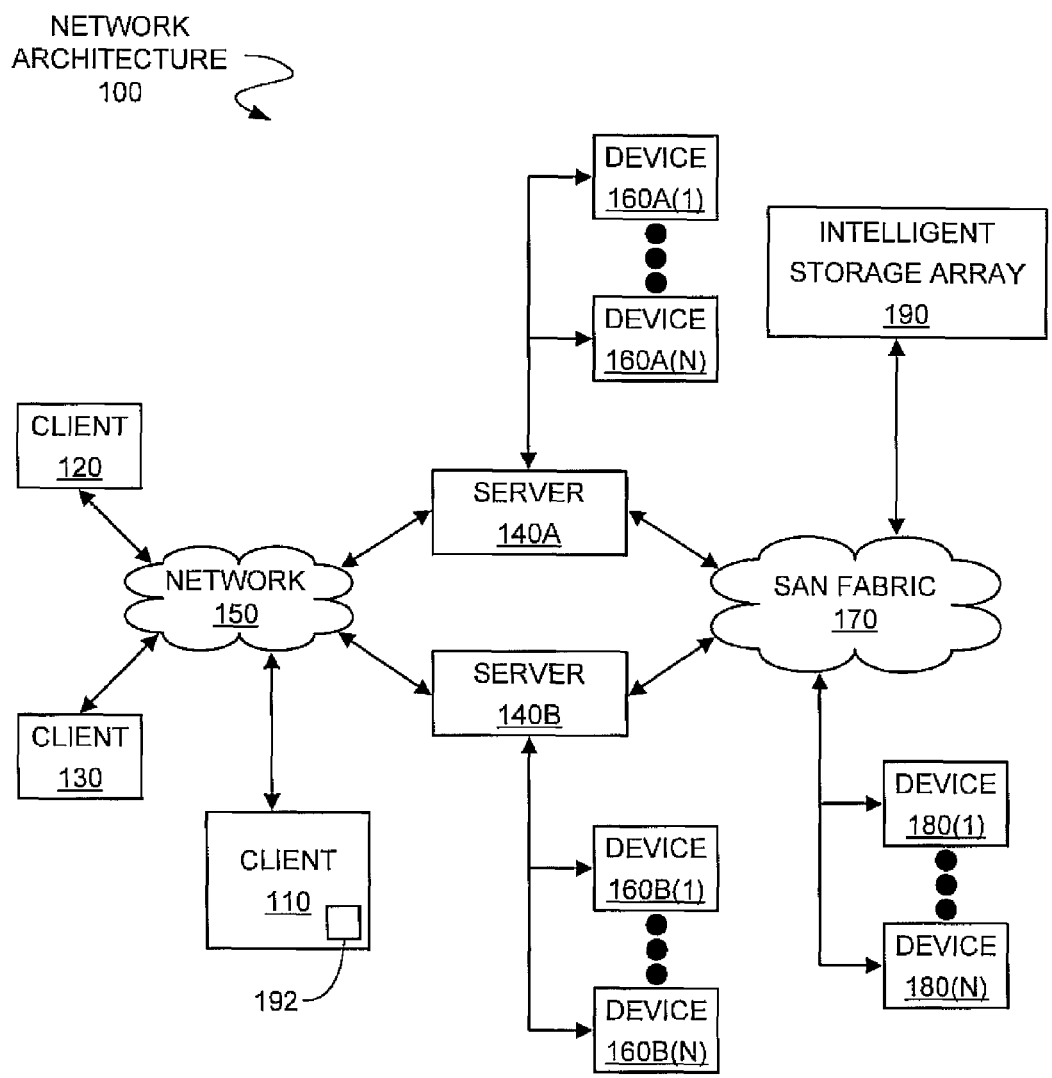
FIG. 1 is a block diagram depicting an exemplary network architecture that can serve as a platform for embodiments of the present invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "decoding," "receiving," "sending," "using," "applying," "calculating," "incrementing," "comparing," "selecting," "summing," "weighting," "computing," "accessing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 7:
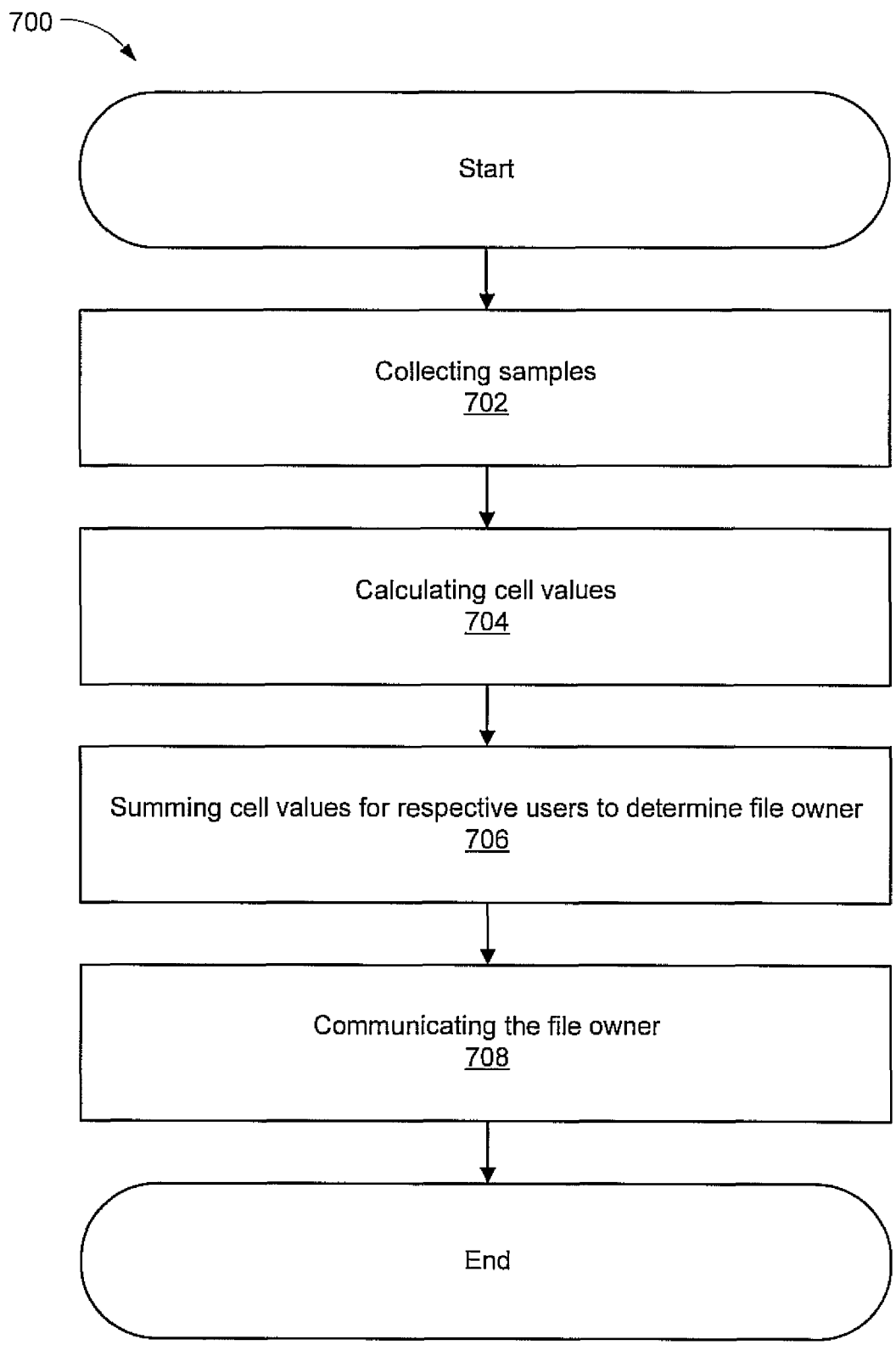
FIG. 7 is an exemplary flow diagram of a method of automatic file owner identification according to an embodiment of the present invention.
Figure 8:
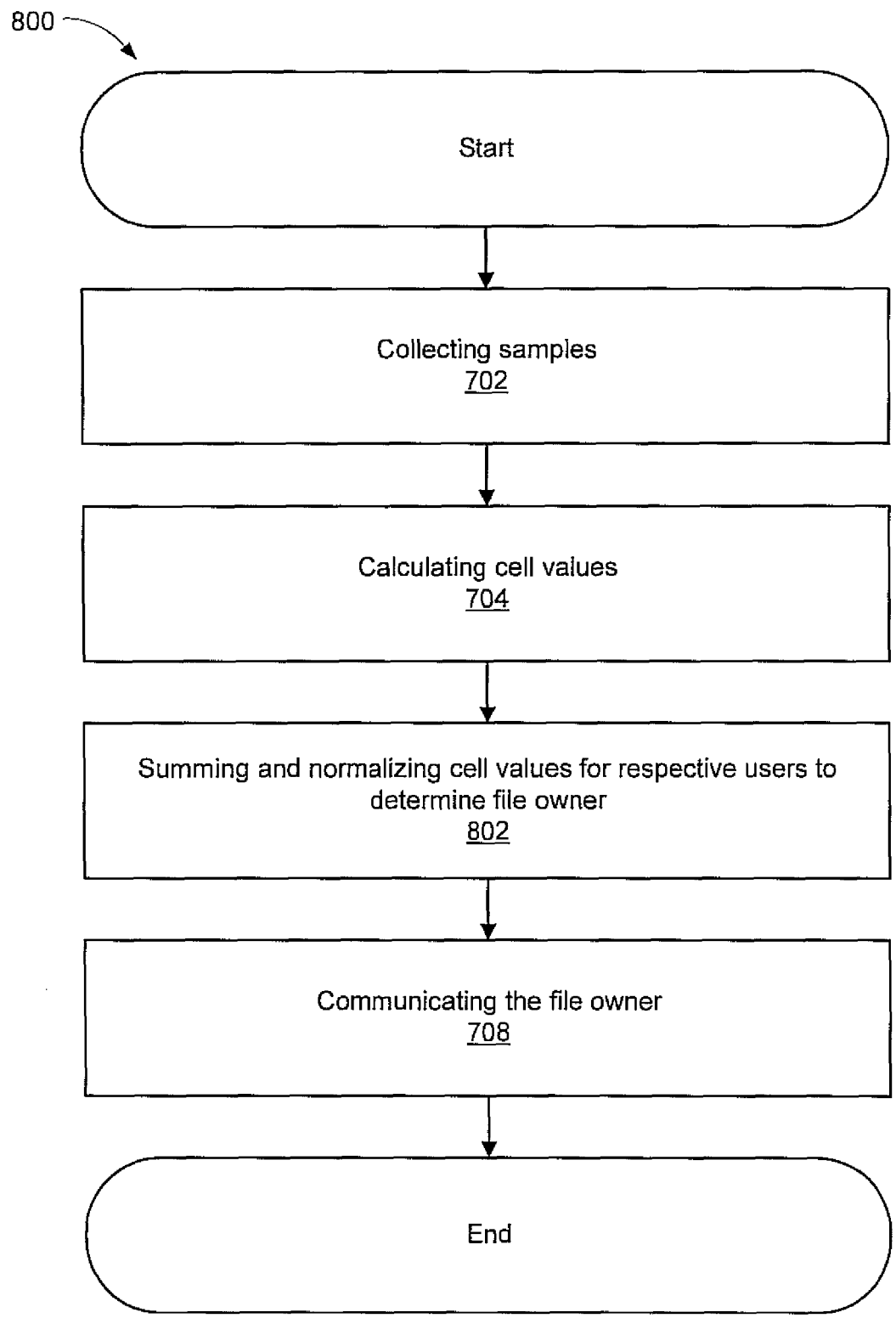
FIG. 8 is an exemplary flow diagram of a method of automatic file owner identification according to an embodiment of the present invention.

FIGS. 7 and 8 are flowcharts of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

The flowcharts of FIGS. 7 and 8 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the discussion that follows, unless otherwise noted, a "connected" refers to communicatively coupling elements via a bus, wireless connection (wifi), Bluetooth, infrared, USB, Ethernet, FireWire, optical, PCI, DVI, etc.

FIG. 1 is an exemplary system in which embodiments of the present invention can be implemented to accurately and automatically determine file ownership from among a plurality of file users. FIG. 1 is a block diagram depicting a network architecture 100 in which client systems 110, 120, and 130, as well as storage servers 140A and 140B (any of which can be implemented using computer system 200 (FIG. 2)), are coupled to a network 150. Storage server 140A is further depicted as having storage devices 160A(1)-(N) directly attached, and storage server 140B is depicted with storage devices 160B(1)-(N) directly attached. Servers 140A and 140B may contain a plurality of files that may be shared among a plurality of users. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120, and 130 via network 150. Intelligent storage array 190 is also shown as an example of a specific storage device accessible via SAN fabric 170.

With reference to computer system 200 (FIG. 2), modem 247 (FIG. 2), network interface 248 (FIG. 2), or some other method can be used to provide connectivity from each of client computer systems 110, 120, and 130 to network 150. Client systems 110, 120, and 130 of FIG. 1 are able to access information on storage server 140A or 140B using, for example, a web browser or other client software (not shown). Such a client allows client systems 110, 120, and 130 to access data hosted by storage server 140A or 140B or one of storage devices 160A(1)-(N), 160B(1)-(N), 180(1)-(N), or intelligent storage array 190. FIG. 1 depicts the use of a network such as the Internet or exchanging data, but the embodiments of the present invention are not limited to the Internet or any particular network-based environment. In the present embodiments, a method of automatic file ownership identification 192 may be performed in one of the client computer systems 110, 130, and 130. However, the method of file ownership identification 192 is not limited to the client computer systems 110, 130, and 130, and may also operate within, for example, cloud computing environments.

Figure 2:
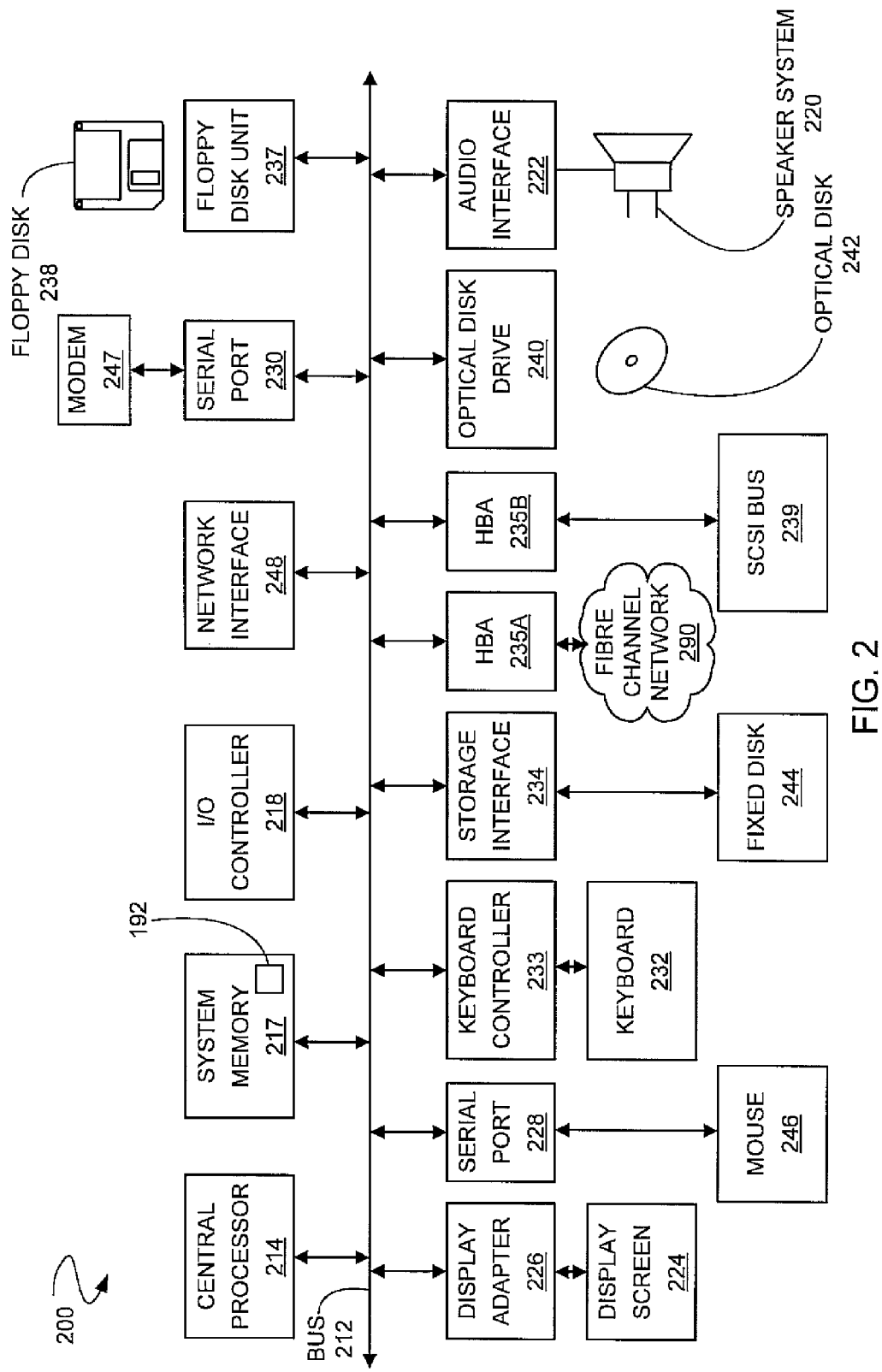
FIG. 2 is a block diagram depicting a computer system suitable for implementing embodiments of the present invention.

FIG. 2 depicts a block diagram of a computer system 200 suitable for implementing embodiments of the present invention. In the discussion to follow, various and numerous components and elements are described. Various combinations and subsets of those components can be used to implement the devices mentioned in conjunction with FIG. 1. For example, client systems 110, 120, and 130 may each be a full-function computer system that employs many, if not all, of the features of the computer system 200. However, the servers 140A and 140B may utilize only the subset of those features needed to support the functionality provided by those devices. For example, the servers 140A and 140B may not need a keyboard or display, and may execute a relatively sparse operating system that supports the functionality of data storage and data access and the management of such functionality.

Computer system 200 of FIG. 2 includes a bus 212 which interconnects major subsystems of computer system 200, such as a central processor 214, a system memory 217 (typically RAM, but which may also include ROM, flash RAM, or the like), an input/output controller 218, an optional external audio device, such as a speaker system 220 via an audio output interface 222, an optional external device, such as a display screen 224 via display adapter 226, serial ports 228 and 230, an optional keyboard 232 (interfaced with a keyboard controller 233), an optional storage interface 234, an optional floppy disk unit 237 operative to receive a floppy disk 238, an optional host bus adapter (HBA) interface card 235A operative to connect with a Fibre Channel network 290, an optional host bus adapter (HBA) interface card 235B operative to connect to a SCSI bus 239, and an optional optical disk drive 240 operative to receive an optical disk 242. Also, optionally included can be a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 200 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or network interface 248. In the current embodiment, the system memory 217 comprises instructions that when executed cause said system to perform the method of file ownership identification 192.

Storage interface 234, as with the other storage interfaces of computer system 200, can connect to a standard computer readable medium for storage and/or retrieval of information, such as fixed disk drive 244. Fixed disk drive 244 may be part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
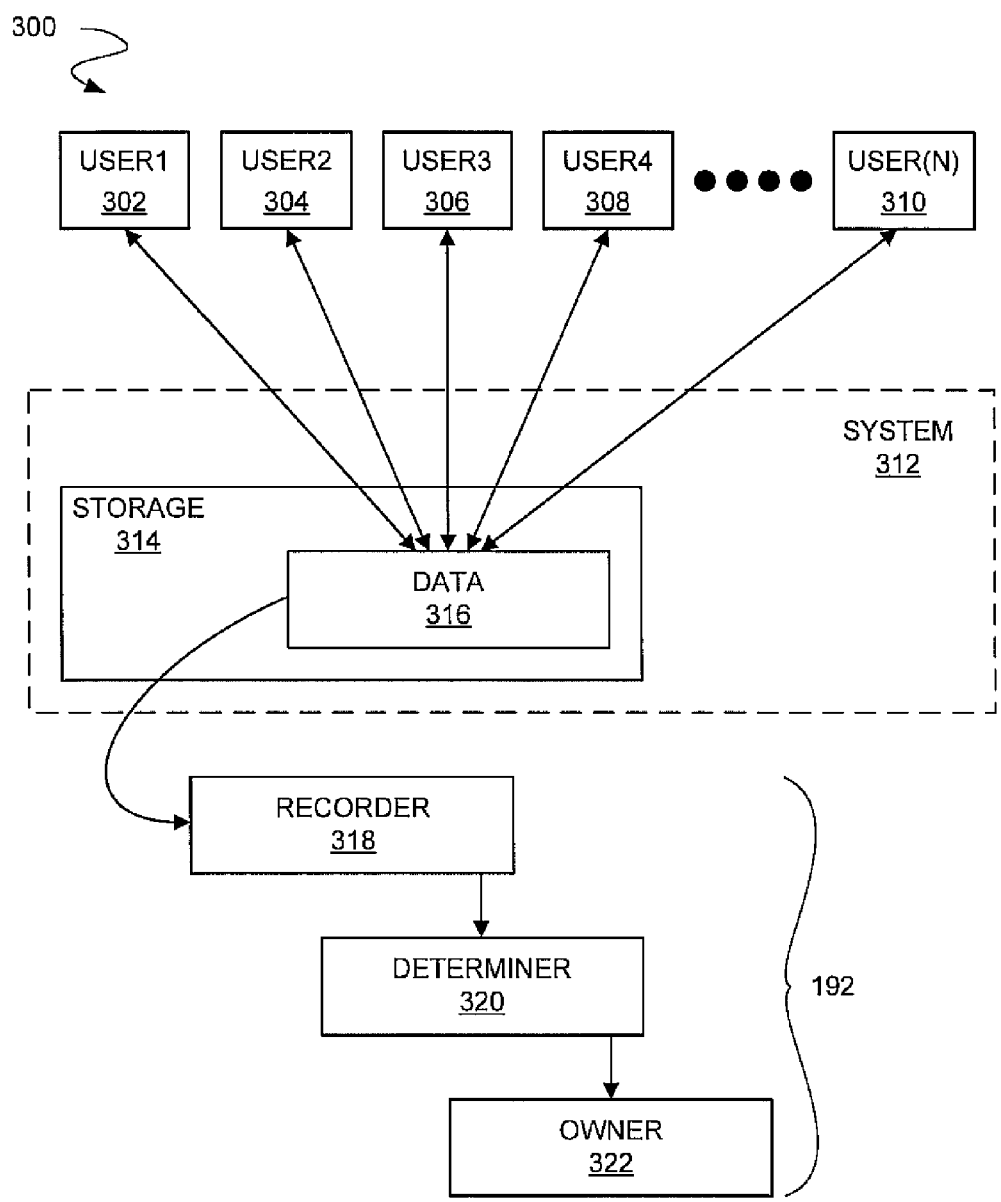
FIG. 3 is a block diagram depicting a security remediation process.

FIG. 3 depicts a block diagram of an exemplary security remediation process 300 that requires file ownership identification in order to function effectively. Embodiments of the present invention provide methods and systems for automatically and accurately identifying the data owner from a plurality of users that share the data. System 312 has storage 314 with data 316. The data 316 has been compromised, for example by deletion or overwriting. After the data 316 has been recovered, the owner needs to be identified. However, the data 316 has been accessed over time by many users including: User1 302, User2 304, User3 306, User4 308, . . . User(N) 310. The data owner needs to be identified.

A method of file ownership identification 192 in accordance with one embodiment, collects information from a recorder 318, which has recorded access logs based on the user access to the data 316. Next a determiner 320 automatically analyzes the information from the recorder 318 and automatically determines an owner 322 of the data 316.

Figure 4:
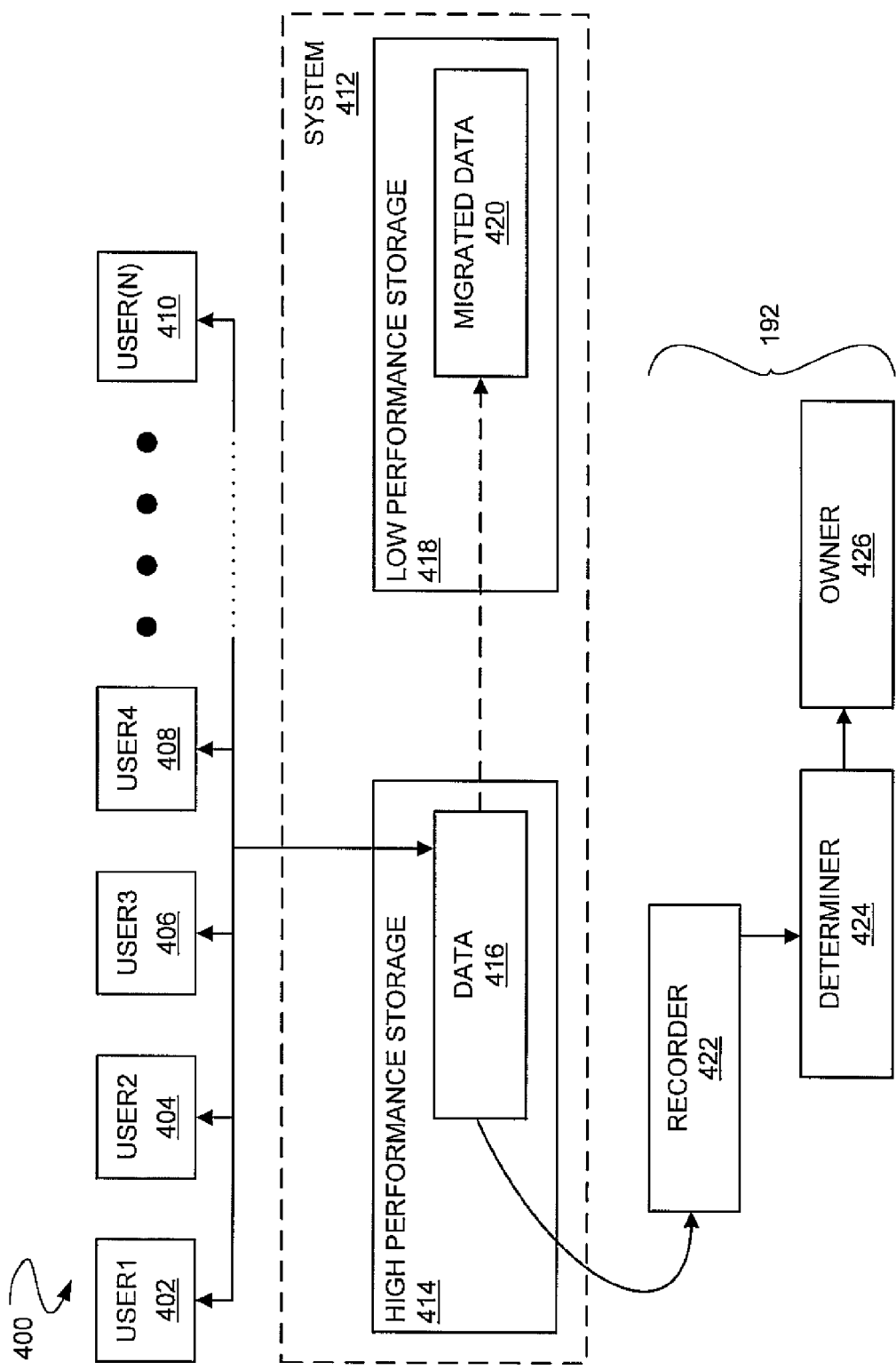
FIG. 4 is a block diagram depicting a data migration process.

FIG. 4 depicts a block diagram of an exemplary data migration process 400 that requires file ownership identification in order to function effectively. Embodiments of the present invention provide methods and systems for automatically and accurately identifying the data owner from a plurality of users that share the data. System 412 has high performance storage 414 with data 416. In addition, the system 412 has low performance storage 418. In the case where the data 416 may have not been accessed in some time, an administrator may want to move the data 416 from the high performance storage 414 to the low performance storage 418. However, before the data 416 can be transferred to the low performance storage 418 and become migrated data 420, the owner 426 of the data 416 needs to be identified and notified.

Identification of the owner of the data 416 can be difficult if the data 416 has been accessed over time by many users including: User1 402, User2 404, User3 406, User4 408, . . . User(N) 410. Therefore, a method of file ownership identification 192 in accordance with an embodiment of the present invention collects information from a recorder 422, which has recorded access logs based on user access to the data 416. Next a determiner 424 automatically analyzes the information from the recorder 422 and automatically determines the owner 426 of the data 416.

It will be appreciated that the security remediation process 300 and the data migration process 400 are only two examples of many uses for the methods of file ownership identification 192 in accordance with embodiments of the present invention. Embodiments of the present invention 192 can be used in any case where the owner of a file needs to be identified. For example, embodiments of the present invention 192 can also be used for data compliance.

Figure 5:
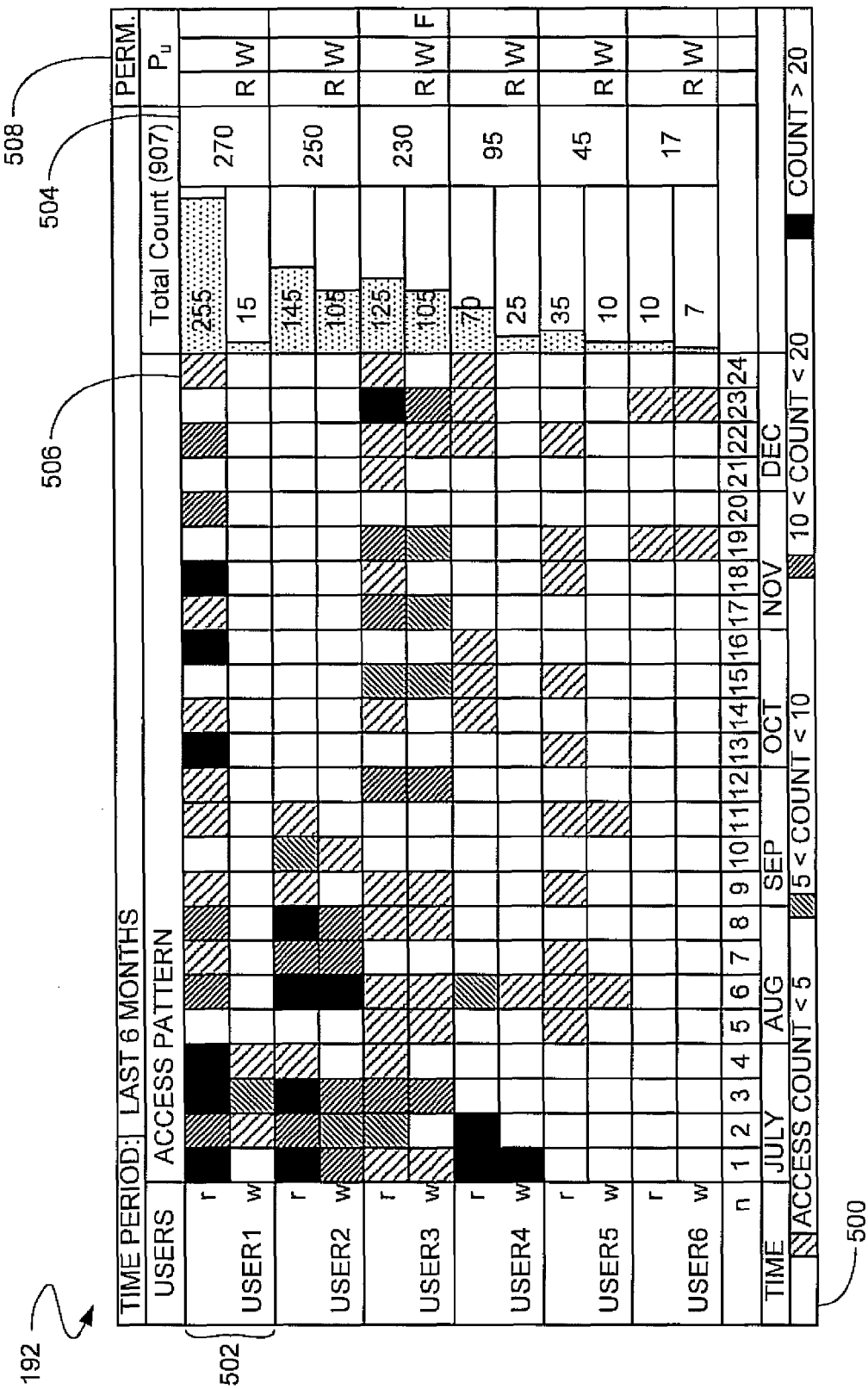
FIG. 5 is an access pattern graph for a method of automatic file ownership identification according to an embodiment of the present invention.

FIG. 5 depicts an access pattern graph 500 for a method of file ownership identification 192, according to an embodiment of the present invention. The embodiment of file ownership identification 192 is based on a plurality of use elements for data, for example a data file, including a type of access 502 (for example, a reading type and a writing type), a number of accesses over time 504 (for example, an access frequency of the file over a sample period and the total accesses over that period), a recentness of accesses 506 (for example, a last time of access), and a user permission 508 of the data (for example, read permission, write permission, and full control permission). The above plurality of use elements may be derived from file records, for example access logs and access control logs in one embodiment.

The above parameters for a given data set can be plotted in the access pattern graph 500 for a period of time, for example 6 months is currently shown. The Y axis of the access pattern graph 500 lists users. The X axis of the access pattern graph 500 lists a selected time period, for example July to December is currently shown. For each user, read and write information is listed in two separate rows.

Each cell in the access pattern graph 500 represents a sample time, one week in the current example. The amount of accesses of a specific type, for example read and write, during the sample time is represented within each cell for a given user. Higher access is darker, while lower access is lighter. Three columns 508 give the effective permissions of each user of the data, and the displayed permissions are a read, a write, and a full control. However more columns may be used for other exemplary permissions, including for instance: a delete, a create, a modify, a list folder content, a read and execute, and a special.

By considering multiple use elements in combination, embodiments of the present invention identify data ownership in a fashion that reduce the number of false positives as compared with considering only total number of accesses. For example, in the access pattern graph 500, User3 is the owner of the file. However, if only the number of accesses over time 504 were used to identify an owner, User1 and User2 would both have more total accesses than User3. For example, even though User1 has the maximum number of total access, User1 has hardly done any write access. In addition, even though User2 has more total access than User3, User2 has not accessed the data for over three months. Thus, identification of the owner by the number of accesses would incorrectly suggest User1 and User2 over User3.

Figure 6:
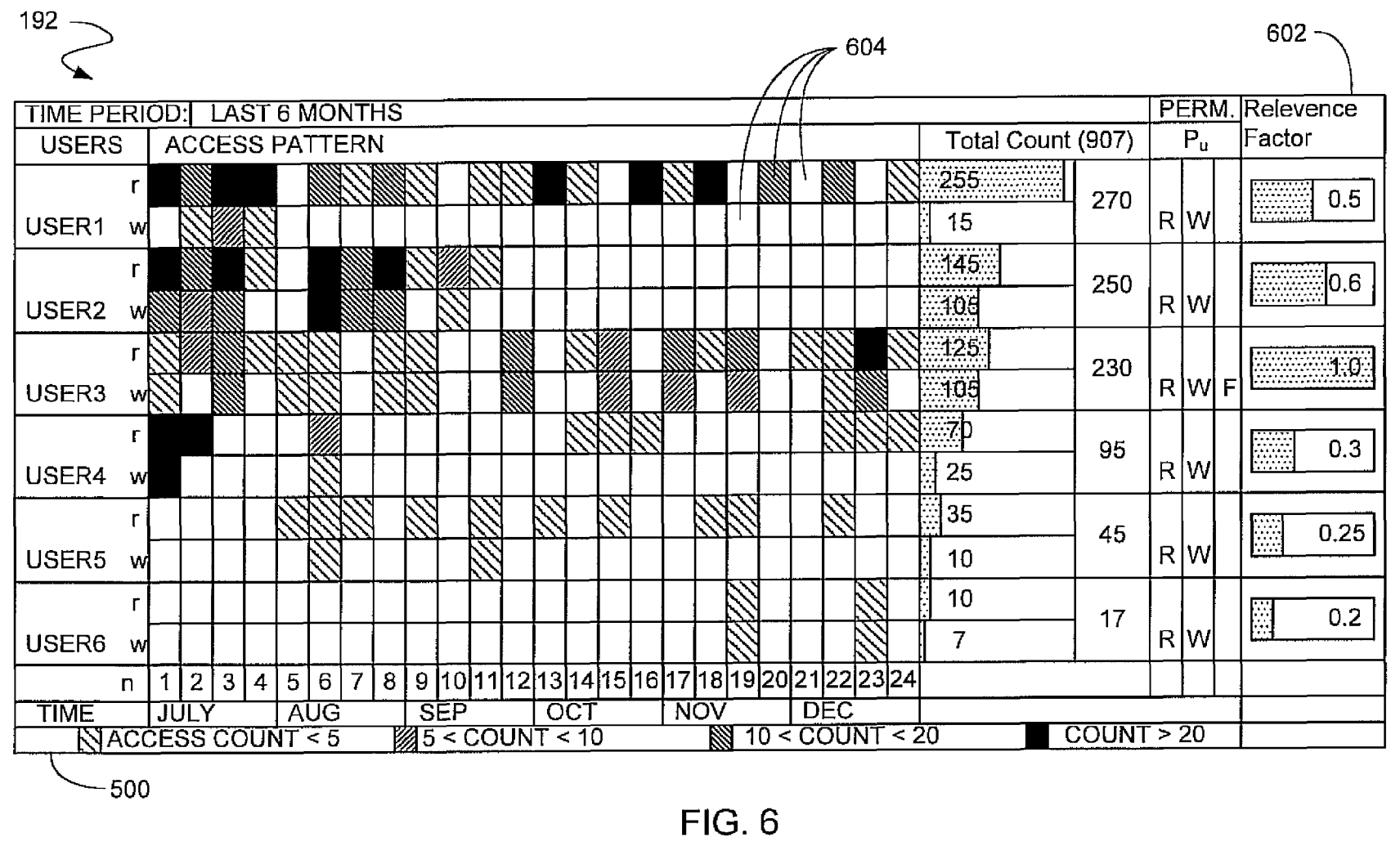

FIG. 6 depicts the access pattern graph 500 including a relevance factor 602 as is determined in accordance with embodiments of the present invention. The relevance factor 602 is determined for each user and may be used to quickly determine the data owner at a glance. An administrator can also verify why a user has been recommended as a data owner, by quickly scanning the rest of the access pattern graph 500.

In the current embodiment, cells 604 are in rows for each user. The cells 604 are in read rows and write rows. However, in alternate embodiments additional access types can be listed in additional rows of cells. In order to obtain the relevance factor for a given user, the relevance of each cell for each user is first calculated. In accordance with one embodiment, the relevance of a single cell can be calculated by the formula:

Relevance of a cell for a User=$(A_i)(K*n)$(No. of Access)$(P_u)$

Where
n is the time sample number of the cell
K is the weight assigned to the time represented by the sample number n
$A_i$ is the weight for the Access Type of the cell. For the access pattern graph 500 there are two exemplary weights: one for read (R), one for write (W), and one for full control (F)
No. of Access is the number of access that happened in the cell
$P_u$ is the weight based on the permission given to a user. In the current embodiment, this weight remains constant for a given user across the user's accesses.

As described above, K, $A_i$, and $P_u$ are assigned weights based on relevance by an administrator.

The total relevance for a user is then the sum of the relevance of all the cells where the user has made some access. This is represented by the equation:

$$\text{Relevance of a User} = \sum_{n=1}^{N}(A_i)(K*n)(\text{No. of Access})(P_u)$$

Where N (in this case 24) is the total number of samples (in this case a week) as shown in the access pattern graph 500.

The relevance of the users may then be normalized in one embodiment by dividing the relevance of each user by the highest relevance to obtain the Relevance Factor, illustrated by the formula:

(Relevance of a User)/(Highest Relevance Obtained for any User)

The user with relevance of 1 is recommended as the data owner. However, normalization is optional.

Therefore, the above equations and the access pattern graph 500 illustrate that a plurality of samples is collected from operations of a file by a plurality of users. A respective factor for each sample for each of the plurality of users is calculated. Each respective factor is based on a plurality of use elements, including the type of access, the number of accesses at a given time and during the period specified, the recentness of access and the permissions the user has on the data set. These use elements are represented as:
n is a sample number of an individual sample,
K is a weight assigned to the time represented by n,
$A_i$ is a weight for Access Type,
No. of Access is a number of access that occurred in the cell, and
$P_u$ is a weight based on the permission given to an individual user u.

Based on a plurality of respective use elements for each user, a factor is computed for each cell for each user. Values are determined by summing all factors for a plurality of samples for a user, calculating a respective value for every user of the file, and normalizing the respective value for every user to obtain a respective relevance factor for each user. The values represent the likelihood of file ownership for each of the plurality of users, and the values may be displayed in the access pattern graph 500 or simply reported as an output.

FIG. 7 depicts a flowchart 700 of an exemplary method of automatic file owner identification according to an embodiment of the present invention. In a step 702, samples are collected based on different use elements, indicating usage of a file by users. These may be collections as the result of access logs and access control logs. For example, in FIG. 6 read and write file usages by six users have been collected. The reads and writes of the users are displayed over time, and the access counts of the users are represented by shading. In addition to the access information, user permissions are also collected. In FIG. 6, user permission data is represented in the $P_u$ columns as read ("R"), write ("W"), or full ("F").

In a step 704, factor values are calculated for each of the cells represented in FIG. 6. For example, in FIG. 6 the cells are arranged by access type in read rows and write rows. However, in alternate embodiments additional access types can be listed in additional rows of cells. There may be multiple cells per sample period. The cell values are determined from the equation:

Relevance of a cell for a User=$(A_i)(K*n)$(No. of Access)$(P_u)$

As described above, K, $A_i$, and $P_u$ are assigned weights based on relevance by an administrator. For example, in order to increase the relevance of most recent access types, the value of K can be altered to give increased value to more recent data accesses. Also, to increase relevance or writes, for instance, to reads, the $A_i$ coefficients for writes can be made higher than for reads.

In a step 706, the factor values of each cell are summed for their respective users. Based on the summation of the users' cells, one of the users is automatically determined as the file owner e.g., the highest summation value. For example in FIG. 6, User3 is determined as the file owner.

In a step 708, the file owner is communicated and/or displayed. For example, in FIG. 6 an on-screen or printed graph is automatically crated and displayed and/or printed. The graph displays easily readable information regarding the file users and their access. In addition, the graph displays a recommended user. However, in alternate embodiments a recommended file owner may only be communicated, displayed, or automatically assigned. Optionally, the summed factors for each user can be normalized.

FIG. 8 depicts a flowchart 800 of an exemplary method of automatic file owner identification according to an embodiment of the present invention. The flowchart 800 has the steps 702, 704, and 708 from the flowchart 700. In a step 802, the factor values of each cell are summed for their respective users. The summed factor values for each user may be normalized, and the user with a value of one is recommended as the file owner. For example, in FIG. 6 the normalized values are represented as relevance factors: User1 has a value of 0.5, User2 has a value of 0.6, User3 has a value of 1.0, User4 has a value of 0.3, User5 has a value of 0.25, and User6 has a value of 0.2. Thus, User3 with a value of 1.0 is recommended as the file owner. The determined owner is then reported, step 708.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of automatic file owner identification, said method comprising:
   collecting a plurality of samples indicating usage of a file by a plurality of users;
   calculating, using at least one computer processor, a plurality of factors based on said plurality of users, wherein a respective factor is calculated for each of said plurality of users, wherein each respective factor for each sample equals $(A_i)(K*n)(N)(P_u)$, wherein:
   n is a sample number of an individual sample;
   K is a weight assigned to said time represented by each sample n;
   $A_i$ is a weight for access type;
   N is a number of accesses that occurred in said sample; and
   $P_u$ is a weight based on permissions given to an individual user u;
   calculating a respective value for each of the plurality of users of said file based on said use elements by summing the plurality of factors associated with the plurality of samples;
   automatically determining a file owner of said file from among said plurality of users based on the plurality of factors, wherein the file owner is determined based on said calculated respective value for each of the plurality of users; and
   communicating said file owner.

2. The method of claim 1 wherein each respective factor is based on a plurality of use elements, wherein said plurality of use elements comprises:
   access type;
   numbers of accesses over given times;
   recentness of said accesses; and
   user permissions of said file.

3. The method of claim 2 wherein:
   said access type comprises a reading type and a writing type;
   said numbers of said accesses over given times comprises an access frequency of said file over a sample period; and
   said user permissions of said file comprises at least one of a read permission, a write permission, and a full control permission.

4. The method of claim 2 wherein:
   said access type is given tunable access weight;
   said numbers of said accesses over given times is given a tunable frequency weight; and said user permissions of said file is given tunable permissions weight.

5. The method of claim 1 further comprising:
   calculating a respective normalized value from said respective value for each of the plurality of users, wherein said file owner has said normalized value equal to 1.0.

6. The method of claim 1 wherein said communicating comprises displaying an access pattern graph, comprising said plurality of factors.

7. The method of claim 1 wherein said collecting comprises accessing access logs and access control logs pertaining to said file and said plurality of users.

8. A method of automatic file owner identification, said method comprising:
   collecting a plurality of samples from operations of a file by a plurality of users;
   calculating, using at least one computer processor, a respective factor for each sample for each of said plurality of users, wherein each respective factor for each sample equals $(A_i)(K*n)(N)(P_u)$, wherein:
   n is a sample number of an individual sample;
   K is a weight assigned to said time represented by each sample n;
   $A_i$ is a weight for access type;
   N is a number of accesses that occurred in said sample; and
   $P_u$ is a weight based on permissions given to an individual user u;
   automatically determining values representing likelihood of file ownership for each of said plurality of users based on a plurality of respective factors for each of the plurality of users, wherein said determining values comprises summing the plurality of factors associated with the plurality of samples; and
   displaying said values in a graph.

9. The method of claim 8 wherein said determining values further comprises:
   calculating a respective value for each of the plurality of users of said file based on factors of said user over a sample duration; and
   normalizing said respective value for each of the plurality of users to obtain a respective relevance factor for each user.

10. The method of claim 8 wherein said operations comprises at least one of a read, a write, a delete, a create, a modify, a list folder content, a read and execute, a special, and a full control.

11. The method of claim 8 wherein said displaying comprises displaying an access pattern graph comprising:
    a list of users;
    a period of time;
    access information of said list of users;
    user permissions; and
    said values for said list of users.

12. The method of claim 8 wherein said collecting comprises accessing at least one of access logs and access control logs pertaining to said file and said plurality of users.

13. A system comprising:
    a processor; and
    memory coupled to the processor, wherein said memory comprises instructions that when executed cause said system perform a method of automatic file ownership identification, said method comprising:
    collecting a plurality of samples indicating usage of a file by a plurality of users;
    calculating a respective factor for each sample for each of said plurality of users, wherein said respective factor for each sample equals $(A_i)(K*n)(N)(P_u)$, wherein:
    n is a sample number of an individual sample;
    K is a weight assigned to said time represented by each sample n;
    $A_i$ is a weight for access type;

N is a number of accesses that occurred in said sample; and $P_u$ is a weight based on permissions given to an individual user u;

calculating a respective value for each of the plurality of users of said file based on said use elements by summing the plurality factors associated the plurality of samples;

automatically determining a file owner of said file from among said plurality of users based on a plurality of factors for said plurality of samples, wherein the file owner is determined based on said calculated respective value for each of the plurality of users; and communicating said file owner.

14. The system of claim 13 wherein each respective factor is based on a plurality of use elements, wherein said plurality of use elements comprises:

access type;
numbers of accesses over given times;
recentness of said accesses; and
user permissions of said file.

15. The system of claim 14 wherein:

said access type comprises a reading type and a writing type;
said numbers of said accesses over given times comprises an access frequency of said file over a sample period; and
said user permissions of said file comprises at least one of a read permission, a write permission, and a full control permission.

16. The system of claim 14 wherein:

said access type is given tunable access weight;
said numbers of said accesses over given times is given a tunable frequency weight; and
said user permissions of said file is given tunable permissions weight.

17. The system of claim 13 further comprising:

calculating a normalized value from said respective value for each of the plurality of users, wherein said file owner has said normalized value equal to 1.0.

18. The system of claim 13 wherein said collecting comprises accessing access logs and access control logs pertaining to said file and said plurality of users.

* * * * *